United States Patent [19]
Ishizuka

[11] 3,988,087
[45] Oct. 26, 1976

[54] HIGH PRESSURE APPARATUS

[76] Inventor: Hiroshi Ishizuka, 19-2, Ebara 6-chome, Shinagawa, Tokyo, Japan

[22] Filed: Jan. 23, 1976

[21] Appl. No.: 651,755

[52] U.S. Cl. .......................... 425/77; 425/DIG. 26; 425/DIG. 115
[51] Int. Cl.² ........................................ B30B 11/32
[58] Field of Search ....... 425/77, DIG. 26, DIG. 115

[56] References Cited
UNITED STATES PATENTS

| | | | |
|---|---|---|---|
| 2,992,900 | 7/1961 | Bovenkerk | 425/DIG. 26 |
| 3,543,347 | 12/1970 | Ishizuka | 425/77 |

Primary Examiner—J. Howard Flint, Jr.
Attorney, Agent, or Firm—Frank J. Jordan

[57] ABSTRACT

A high pressure apparatus for synthesizing diamonds which comprises a pair of opposed tapered pistons each having a truncated end surface, a pair of hollow truncated-conical piston protectors each of which is made of a ductile metal and arranged on the tapered piston surface, and annular die member having a substantially cylindrical wall of a diameter larger than that of each piston truncated end surface, a hollow cylindrical body made of less compressibility coefficient material than the die material and having an outer diameter substantially same or slightly smaller than the diameter of said truncated end surface of each pistons and positioned coaxially within the die cylindrical wall, and gaskets placed respectively at the ends of said cylindrical body.

4 Claims, 1 Drawing Figure

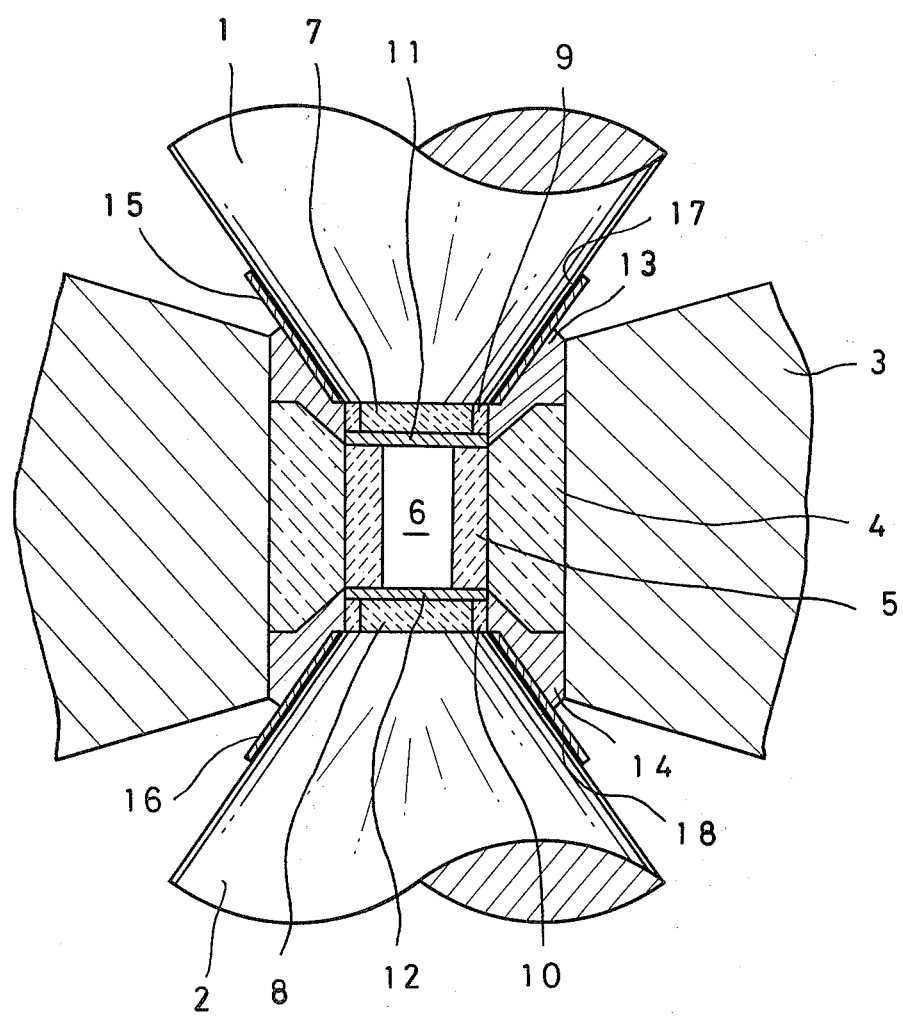

HIGH PRESSURE APPARATUS

The present invention relates to an improvement in or relating to a high pressure apparatus, and more particularly to such apparatus for synthesizing diamonds, which comprises a pair of opposed tapered pistones or punches each having a truncated or flat end surface, an annular die member having a substantially cylindrical wall of a diameter larger than that of each piston truncated end surface, a hollow cylindrical body made of less compressibility coefficient material than the die material and having an outer diameter substantially same or slightly smaller than the diameter of said truncated end surface of each piston and positioned coaxially within the die cylindrical wall, and gaskets placed respectively at the ends of said cylindrical body.

Such type apparatus is disclosed in my U.S. Pat. No. 3,350,743 (British Patent No. 1,131,635). With the arrangement described and illustrated in the U.S. or British Patent the hollow cylindrical body serves to dampen the high pressure and temperature necessary for synthesizing diamonds caused by the movement of the pistons toward one another so that the die member may not be subjected directly to such severe condition and thus can be made of tool steel, high speed steel or die steel instead of conventional sintered WC-Co alloy which is very expensive. Therefore, the Patent shows a way for providing larger apparatus for the production of diamonds or the like to improve their economical efficiency by increasing the yield per run or to obtain higher quality and larger size diamonds by making temperature distribution, pressure gradient and carbon concentration gradient suitable. When the apparatus would further be enlarged based on the principle as disclosed in the Patent, however, the problem of protection of the pistons and the die member is to be more important. As material for the gaskets to seal the pressure caused by the movement of the pistons toward one another, pyrophillite is preferable to effectively prevent a damage of the pistons due to a local excess pressure on the tapered surface. However, pyrophillite is expensive and not so readily available. In order to make it possible to use a cheaper material for the gasket such as agalmatolite, chamotte or the like for a larger size higher pressure apparatus, I proposed to protect each piston with a thin cover member of hollow truncated-cone shape which member is arranged on the tapered piston surface and made of a ductile metal or its alloy, such as iron, mild steel, alloy steel, copper, copper alloy, aluminum, aluminum alloy, nickel, nickel alloy, titanium or titanium alloy (U.S. Pat. No. 3,543,347 and corresponding British Pat. No. 1,237,146). In the apparatus having the piston procector as referred to above, the advance of the pistons into the die member due to the action of a pressure generating machine, such as a hydraulic press can be attained by compression of the gaskets but causes deformation of the piston protector. It has been found that the deformation of the piston protector requires a relatively large press load due to a frictional resistance between the tapered piston surface and the inner surface of the protector and thus increases higher press load to obtain necessary high pressure.

In order to avoid or eliminate such pressure waste, I have made various experiments from which it has been found that a lubricative layer of an inorganic material applied between the inner surface of the piston protector and the tapered surface of the piston is very effective.

Therefore, the present invention provides a high pressure apparatus which comprises a pair of opposed tapered pistons each having a truncated end surface, a pair of hollow truncated-conical piston protectors each of which is made of a ductile metal and arranged on the tapered piston surface, an annular die member having a substantially cylindrical wall of a diameter larger than that of each piston truncated end surface, a hollow cylindrical body made of less compressibility coefficient material than the die material and having an outer diameter substantially same or slightly smaller than the diameter of said truncated end surface of each piston and positioned coaxially within the die cylindrical wall, and gaskets placed respectively at the ends of said cylindrical body, characterized in that a lubricative layer is formed between the inner surface of each of said piston protectors and the tapered surface of each of said pistons.

The lubricative layer may be of a relatively soft metal of tin, lead or zinc; a soft alloy thereof such as a solder; a non-metallic material such as graphite; or an inorganic compound such as molybdenum disulfite or boron nitride. The material for forming the layer can be used solely or as a mixture of two or more kinds of the materials. The layer may be of about a few to about one hundred microns in thickness and can be formed on the inner surface of the piston protector by utilizing any conventional manner, for instance, a chemical plating, electric plating, dipping, evaporation method or painting method.

As the ductile metal or its alloy, for the piston protector various metal or its alloy may be used as referred to but it is preferable to use mild steel. The thickness of the piston protector may be selected with taking into consideration of the size of free flat end surface of the piston. When mild steel is used, it is preferable to select the thickness of the protector based on the followings.

| Size of flat end surface of piston (diameter; mm) | Thickness (mm) |
|---|---|
| 18 | 0.2 to 0.5 |
| 75 | 1.0 to 3.0 |

The present invention will be better understood from the following description of the preferred embodiment with reference to the accompanying drawing.

The drawing shows a diagrammatic section of the essential portion of the high pressure apparatus according to the present invention.

In the drawing, reference numerals 1 and 2 represent respectively pistons or punches made of sintered WC-Co alloy each having a truncated or flat end surface with diameter of 75mm and having tapered angle of 36°. Reference numeral 3 represents an annular die member made of a steel having an inner diameter of 160mm, 4 is a hollow cylindrical body of alumina sintered so that there may be substantially no pore, 5 is a hollow cylinder or refractory material to accomodate a reaction chamber 6 therein. When diamonds should be synthesized by the apparatus, raw materials of powdered graphite and a metallic catalyst such as cobalt particles are filled in the reaction chamber 6. Reference numerals 7, 8 are circular rings of rigidly sintered refractory material of agalmatolite as heat and electric insulators, 9, 10 are steel rings for applying electric power, 11, 12 are metallic plates as electrodes, 13, 14 are lightly sintered gaskets of agalmatolite, 15, 16 are piston protectors of mild steel having about 2mm in thickness, and 17, 18 are lubricative layers of tin formed on the inner surfaces of the piston protectors 15, 16 opposing to the tapered surfaces to the pistons 1, 2.

For synthesizing diamonds, a mixture of graphite powder and cobalt particles was filled in the reaction chamber 6 and the reaction chamber 6 was electrically heated through the pistons 1, 2. In this case, the press load of 6000 short tons was required to generate the pressure of 50 Kbar in the reaction chamber 6.

While the press load of 7000 short tons was required in a corresponding prior art apparatus having details similar to that as just being disclosed but having no lubricative layers.

According to the present invention, the following advantages can be obtained in comparison with the corresponding prior art apparatus.

1. Pressure stroke of the pistons can be made longer

By virtue of the lubricative layers, the pistons can advance further into the die member, so that the free flat end of each piston beyond the smaller diameter end of each piston protector as the latter deforms. In this connection, please note that, according to the prior art apparatus, the piston protectors tend to decrease the piston stroke.

2. Hydraulic Press of relatively small capacity can be utilized to generate high pressure According to the apparatus of the present invention, the friction force between each piston and each piston protector can be reduced due to the lubricative layer to relatively decrease the component force of piston in the direction for compressing the gasket. If the capacity of reaction chamber is constant, therefore, relatively small press load would be required for the piston, in comparison with the prior art apparatus.

3. Reaction chamber can be made larger in size

If the capacity of hydraulic press for operating the pistons is constant, the capacity of the reaction chamber can be made larger, on the grounds as stated in Items 1 and 2.

4. Breaking of piston protector can be prevented

According to the prior art apparatus, each piston moves intermittently while overcoming friction forces between the piston protector and the gasket and between the piston and piston protector. The latter friction force is remarkably high and thus a part of the protector may be broken due to a so-called work hardening or rolling action, when the protector deforms, to cause an undesired jetting out of the materials accomodated in the reaction chamber. As a measure for overcoming this problem, the piston protector has been made thicker but this decreases the piston stroke.

According to the present invention, the piston moves continuously to gradually deforms the protector and thus the possibility of breaking down of the protector can remarkably be reduced.

I claim:

1. A high pressure apparatus which comprises a pair of opposed tapered pistons each having a truncated end surface, a pair of hollow truncated-conical piston protectors each of which is made of a ductile metal and arranged on the tapered piston surface, an annular die member having a substantially cylindrical wall of a diameter larger than that of each piston truncated end surface, a hollow cylindrical body made of less compressibility coefficient material than the die material and having an outer diameter substantially same or slightly smaller than the diameter of said truncated end surface of each piston and positioned coaxially within the die cylindrical wall, and gaskets placed respectively at the ends of said cylindrical body, characterized in that a lubricative layer is formed between the inner surface of each of said piston protectors and the tapered surface of each of said pistons.

2. A high pressure apparatus as claimed in claim 1, wherein said lubricative layer is formed on an inner surface of each piston protector.

3. A high pressure apparatus as claimed in claim 1, wherein said lubricative layer is formed by a material selected from a group consisting of tin, lead, zinc, solder, graphite, molybdenum disulfite, boron nitride and a mixture of these materials.

4. A high pressure apparatus as claimed in claim 2, wherein said lubricative layer has thickness ranging from a few to one hundred microns.

* * * * *